(12) United States Patent
Jacobs et al.

(10) Patent No.: US 7,842,735 B2
(45) Date of Patent: Nov. 30, 2010

(54) FLUOROPOLYMER FOAMS, PROCESS TO MAKE THEM AND APPLICATIONS THEREOF

(75) Inventors: Paul Jacobs, Croyden (GB); Roger Lock, Croyden (GB); Neil Witten, Croyden (GB); Michael Werth, Croyden (GB); Ramin Amin-Sanayei, Croyden (GB)

(73) Assignee: Zotefoams PLC (GB)

( * ) Notice: Subject to any disclaimer, the term of this patent is extended or adjusted under 35 U.S.C. 154(b) by 752 days.

(21) Appl. No.: 11/568,360

(22) PCT Filed: Apr. 28, 2005

(86) PCT No.: PCT/GB2005/001626
§ 371 (c)(1),
(2), (4) Date: Jun. 14, 2007

(87) PCT Pub. No.: WO2005/105907
PCT Pub. Date: Nov. 10, 2005

(65) Prior Publication Data
US 2007/0293592 A1    Dec. 20, 2007

(30) Foreign Application Priority Data
Apr. 28, 2004  (GB) .................................. 0409482.7

(51) Int. Cl.
*C08J 9/14*  (2006.01)

(52) U.S. Cl. ............................ 521/82; 521/90; 521/94; 521/97; 521/145

(58) Field of Classification Search ................... None
See application file for complete search history.

(56) References Cited

U.S. PATENT DOCUMENTS

| 3,819,796 | A | * | 6/1974 | Webster et al. ............... 264/321 |
| 4,737,526 | A | | 4/1988 | Mukaiyama et al. |
| 4,764,538 | A | | 8/1988 | Buckmaster et al. |
| 5,885,494 | A | | 3/1999 | Venkataraman et al. |
| 5,922,493 | A | * | 7/1999 | Humphrey et al. .......... 429/316 |
| 6,949,588 | B2 | * | 9/2005 | Park ............................. 521/79 |
| 2003/0233792 | A1 | | 12/2003 | Kramer |

OTHER PUBLICATIONS abstract for JP 9-302134 A (Nov. 1997).*

* cited by examiner

*Primary Examiner*—Marc S Zimmer
(74) *Attorney, Agent, or Firm*—Joseph T. Leone, Esq.; DeWitt Ross & Stevens S.C.

(57) ABSTRACT

Described is a process for making closed cell fluoropolymer foam, and the foam so made. The process includes subjecting a fluoropolymer resin an inert gas at a pressure higher than atmospheric to drive gas into the resin, raising the temperature of the resin to or above its softening point, and reducing the pressure while maintaining the temperature at or above the softening point of the resin, in order to expand the resin to result in closed cell fluoropolymer foam. The resin is cross-linked prior to expansion. The resulting foams can be used in various applications, such as in flotation devices and for making thermal and/or acoustic insulation.

21 Claims, No Drawings

FLUOROPOLYMER FOAMS, PROCESS TO MAKE THEM AND APPLICATIONS THEREOF

CROSS-REFERENCE TO RELATED APPLICATIONS

Priority is hereby claimed to PCT application Serial No. PCT/GB2005/001626, filed 28 Apr. 2005, which claims priority to United Kingdom application Serial No. GB 0409482.7, filed 28 Apr. 2004, both of which are incorporated herein.

The present invention relates to fluoropolymer foams, process to make them and applications thereof. High quality foams are produced by impregnating fluoropolymer resins with inert gas at high pressure and then reducing the pressure to expand the material. The resins are crosslinked to allow the impregnation and expansion to take place well above the normal softening point. The foams obtained can be fabricated into any desired shape, such as pipes, sheets, tapes, blocks and rods, using techniques such as cutting, welding, thermoforming and adhesive bonding. Alternatively the fluoropolymer resin may be expanded directly into the desired shape, for example, by expanding the impregnated fluoropolymer resin in a mould. They are useful in applications where low density or electrical or thermal insulation are required. They have the additional benefits of high purity, low extractability, high radiation and UV resistance, chemical resistance, thermal resistance and low flammability.

Closed cell foams are materials used in applications where light weight, flotation, thermal insulation, electrical insulation and cushioning effects are required. Closed cell foams made out of polystyrene, polyethylene of different densities and polyurethanes are widely known. However, foams made from the cited materials are limited in thermal resistance, chemical resistance, weathering resistance and ageing properties in general terms. Furthermore, standard types of such foams are highly flammable, and there is a need for foams in critical applications such as aerospace, mass transport, marine, construction, electrical, such as cable, electronic, microelectronic and semiconductor and chemical such as in the petrochemical and pharmaceutical industries for foams of high purity which also have chemical resistance, weathering resistance and good fire resistance. Foams made from fluoropolymers can fulfil these requirements.

U.S. Pat. No. 5,885,494 (du Pont) discloses a composite tubular structure which comprises a layer of first fluoropolymer and a substrate in contact with said layer, wherein the first fluoropolymer is foamable at a temperature at which the substrate is either less foamable or is non-foamable. The intention of the disclosed method is to prevent foaming of the substrate compared to the first fluoropolymer layer and one way of doing this is to cross link the substrate material. There is no disclosure however of the first fluoropolymer layer being cross linked.

WO 00/43193 (Tan) discloses a process for the production of micro cellular polymer foams in which a polymer is heated to above its softening point at an elevated pressure and then the pressure is fully or partially released and the temperature quenched to below the softening point. Either the pressure can be reduced to ambient and then the temperature immediately quenched or it can be partially reduced, the temperature cooled to below the softening point, and then the pressure reduced to ambient. No cross linking of the polymer is disclosed.

U.S. Pat. No. 5,837,173 (Ausimont) relates to a process for preparing expanded articles based on ethylene-chlorotrifluoroethylene copolymers having high dielectric characteristics, in which nitrogen is injected directly into a molten polymer blend in a continuous process to result in expansion of the polymer. No cross linking of the polymer is disclosed.

U.S. Pat. No. 4,843,123 (Lee) discloses a process of forming thermosetting fluoropolymer foams by mixing fluid fluoropolymer components and allowing the mixture to gel in a pressure-tight chamber in contact with a gas. The gelled fluoropolymer is then removed from the chamber and then heated at a relatively low temperature to simultaneously cure and foam the fluoropolymer.

The U.S. Pat. Nos. 4,615,850 and 4,675,345 describe the use of chemical blowing agents combined with plasticizers and nucleating agents to produce foams of PVDF homopolymers and copolymers and their mixtures. However, these foams lack purity and do not have a very uniform cell size. The U.S. Pat. No. 4,425,443 further describes the limitations of using certain chemical blowing agents, and in particular the thermal degradation of the resin which can occur. The U.S. Pat. Nos. 5,883,197 and 6,506,809 describe the use of specific nucleating additives to achieve better quality foams. The patents EP 223155 and JP 06047857 A describe the use of a solvent, preferentially dichlorodifluoromethane as the expansion agent for fluoropolymer foams. These processes have the disadvantage of using costly solvents which must be carefully removed so as not to deteriorate chemical resistance and/or purity. The patent JP 07011037 A describes the use of crosslinked PVDF copolymers with expansion ratios of 3 to 50 times in applications which require a fine and uniform cell structure, and excellent flame retardancy, flexibility, moulding processability and melt flow characteristics.

This invention relates generally to a method and products made by this method which allows the production of high quality fluoropolymer foams without any additives. Fluoropolymer resins are subjected to inert gases at elevated temperatures and pressures, whereupon they absorb certain quantities of these gases. Reducing the pressure at a temperature above the softening point of the resin allows these resins to be expanded to produce closed cell fluoropolymer foams with a very homogeneous cell size distribution and a high percentage of closed cells. The expansion stage may take place in the high pressure vessel used to absorb the gases into the resins or in a secondary lower pressure vessel. If a secondary vessel is to be used the resins must be cooled under pressure in order to limit the expansion occurring in the first vessel.

In a first aspect of the present invention there is provided a process for making closed cell fluoropolymer foam comprising the steps of:

(a) subjecting a fluoropolymer resin to at least one inert gas at a pressure preferably higher than atmospheric in order to drive gas into the resin, (a1) raising the temperature of the resin to or above its softening point, wherein steps (a) and (a1) can take place in any order or simultaneously, and (b) reducing the pressure whilst maintaining the temperature at or above the softening point of the resin, in order to expand the resin to result in closed cell fluoropolymer foam, wherein the resin is preferably cross-linked prior to expansion.

It has been discovered that, surprisingly, cross linking the resin prior to expansion helps to make a low density, high quality, closed cell foam product. This is in contrast to the use of cross linking in U.S. Pat. No. 5,885,494 mentioned above, in which cross linking is employed in order to increase molecular weight and prevent expansion of the substrate layer.

Cross linking prior to expansion allows the process to be operated above the melting point of a semi-crystalline resin without severe flow of the material. Operating above the melting point reduces the time for the gas to diffuse into the sheet and increases the amount of gas in the sheet at a given pressure. The process can also be operated without cross linking but this restricts the flexibility of the process. Cross linking can be obtained by use of cross linking agents such as triallylcyanurate and electron beam or gamma irradiation. Preferentially, no chemical cross linking or crosslink promoters are used which give rise to potential for leaching or extraction, but only direct irradiation cross linking is employed. Typical doses for direct radiation cross linking are in the range of 5 to 200 kGy, but a preferential range is 25 to 100 kGy. After cross linking the foamed material has a ratio (tan delta) of dynamic loss modulus to dynamic storage modulus between 0.24 and 0.9 at a temperature between 10 and 100° C. above the melting point.

Although it is preferred that the pressure in step (a) is higher than atmospheric pressure, in theory all that is required is a pressure differential in order to drive the gas into the resin.

The length of time of step (a) depends on factors such as the identity of the resin, its thickness and the temperature and pressure of the gas. Generally speaking, the resin is treated until it becomes saturated with the gas (which can be determined empirically using an iterative weighing process).

In step (b), the temperature is preferably maintained above the softening point until such time as the desired expansion is achieved. This is controlled by controlling the drop in pressure in step (b).

Advantageously, prior to step (a), the fluoropolymer resin is formed into the desired shape, typically a thick sheet although other shapes may be contemplated, using any of the techniques known to those skilled in the art, for example, extrusion, injection moulding or compression moulding. Step (b) may take place in the high pressure vessel used to absorb the gases into the resins.

In one embodiment, step (a) takes place in a high pressure vessel and the expansion step (b) takes place in a second, lower pressure vessel. More preferably, before step (b):

(a2) the pressure is lowered to a pressure higher than atmospheric pressure but lower than the pressure of step (a) and the resin is cooled to below its softening point to result in a partially expanded fluoropolymer resin, (a3) the partially expanded fluoropolymer resin is heated to a temperature above its softening point under a pressure of gas, preferably air or inert gas.

The temperature of the partially expanded resin resulting from step (a2) may be maintained at ambient or advantageously may be reduced to below ambient in order to slow the expected loss of gas from the resin. This has the advantage that the time available between steps (a2) and (a3) can be extended such that step (a3) and (b) can then be carried out at a later time and/or at a remote location.

Those skilled in the art will recognise the use, for this purpose, of storage and shipping containers used in the handling and long distance movement of perishable goods such as meats and other foodstuffs. Such containers typically maintain the content of the container in a sub-ambient temperature environment. Temperatures down to −40° C. (−40° F.) have been utilised.

The partially expanded fluoropolymer resin from step (a2) may be heated in a mould whereupon the heat causes the fluoropolymer resin to soften and expand into the mould. The result is a closed cell fluoropolymer foam artefact of a defined shape. This process is distinct from the thermoforming process in which previously expanded foam is heated and then moulded to the desired shape.

Alternatively, the partially expanded resin from step (a2) may be retained in the form of a high density closed cell fluoropolymer foam without the need for further expansion.

Thus in a second aspect of the present invention there is provided a process for making closed cell fluoropolymer foam comprising the steps of:

(a) subjecting a fluoropolymer resin to at least one inert gas in order to drive gas into the resin, (a1) raising the temperature of the resin to or above its softening point, wherein steps (a) and (a1) can take place in any order or simultaneously, and (a2) lowering the pressure to a pressure higher than atmospheric pressure but lower than the pressure of step (a) and cooling the resin to below its softening point to result in a partially expanded fluoropolymer resin.

In a particularly preferred embodiment, the closed cell fluoropolymer foam is substantially homogeneous. The process is preferably carried out only on the fluoropolymer resin and not on any other material simultaneously with said resin. However, if a second resin is present whilst the process is being carried out, the resin that is cross linked prior to expansion preferably expands more than the non-cross linked resin.

It is particularly preferred that the invention relate to a batch process rather than a continuous process. In other words, discrete batches of resin are individually treated in pressure vessels rather than a potentially infinite length of resin being treated in a continuous process for example in an extruder.

The present invention also relates to the fluoropolymer foams made by the disclosed process, with preference for VDF (vinylidene difluoride)-based polymers and its thermoplastic copolymers.

The present invention also relates to:
the transformation of said fluoropolymer foams by welding, gluing, cutting, routing, punching, stamping, laminating and thermoforming into any desirable shape such as pipes, rods, sheaths, containers, balls, sheets, rolls and tapes
the use of said fluoropolymer foams in flotation devices,
the use of said fluoropolymer foams in any desired shape in thermal and/or acoustic insulation,
the incorporation of said fluoropolymer foams together with sheets, films, foams, textiles, reinforcements or any other natural or synthetic material known to those skilled in the art (such as fabric or leather) into complex structures by lamination, adhesive bonding, sewing and other permanent or temporary fastening techniques,
the use of said fluoropolymer foams in any desired shape in electrical insulation,
the use of said fluoropolymer foams in packaging material or in containers,
the use of said fluoropolymer foams in high purity applications in cleanroom panels, seals, insulation and in equipment,
the use of said fluoropolymer foams in gaskets or seals,
the use of said fluoropolymer foams in sensing devices,
the use of said fluoropolymer foams in self-extinguishing fire barriers, or any combination of any aforesaid use.

As regards the fluoropolymer, foamable fluoropolymers are of such a type that they can be transformed by extrusion, injection moulding, compression moulding or other forming techniques known to those skilled in the art. The fluoropolymers can be semicrystalline or amorphous, preferably they are semicrystalline. Preferably the fluoropolymers can be radiation crosslinked.

Preferably the fluoropolymer is PVDF or a copolymer of PVDF with comonomers hexafluoropropylene (HFP) or chloro-trifluoro-ethylene (CTFE) a mixture of two or more of such polymers, or ECTFE the ethylene-chlorotrifluoroethylene copolymer, or ETFE the ethylene-tetrafluoroethylene copolymer.

Fluoropolymers and copolymers of VDF, such as KYNAR® (Atofina) collectively VDF-based polymers, wherein the VDF portion is greater than the total molecular percent of comonomers, are well known and widely used. Among the variety of fluoropolymers based upon tetrafluoroethylene, chlorotrifluoroethylene, and other specialty fluorine-containing monomers, the VDF-based polymers are unique, offering the widest possible range of processing options to obtain articles having the beneficial attributes associated with improved chemical resistance and surface properties. Thus, among the wide spectrum of fluoropolymers currently used, the VDF-based polymers may be melted in typical processing equipment for thermoplastic resins for extrusion or moulding or combinations such as extrusion-blown film and moulding.

VDF-based polymers can be made by copolymerization of VDF and HFP and/or by substitution or addition of one or more of other fluoromonomers, include but are not limited to, tetrafluoroethylene (TFE), chlorotrifluoroethylene (CTFE), perfluoromethyl vinyl ether (PMVE), perfluoropropyl vinyl ether (PPVE), perfluoroalkyl vinyl ether (PAVE), vinyl fluoride (VF), trifluoroethylene (TrFE), for some or all of the hexafluoropropylene. Also contemplated are any other polymers which are melt processable and crosslinkable by any other means, for example, free radical cross linking.

One skilled in the art will recognize that small quantities of a third monomer known to be copolymerizable with VDF (up to about 10% by weight of the HFP level) may also be included in the above described resins. Such known copolymerizable monomers may, for example, be selected from among C(3-8) alkenes containing at least one fluorine atom, an alkyl vinyl ether containing at least one fluorine atom, an aliphatic or cyclic C(3-6) ketone containing fluorinated α-α' positions and non-fluorinated C(2-4) alkenes, C(3-6) alkyl vinyl ethers or C(4-6) vinyl esters. An example of a thermoplastic terpolymer is Dyneon THV which is a polymer of VDF, HFP and TFE.

As regards the PVDF copolymer, the proportion of VDF is at least 60% by weight and preferably at least 85% by weight. The comonomers are advantageously chosen from HFP, CTFE, TFE and TrFE. The fluoropolymer resins may be pigmented or include other additives, modifiers or reinforcements. In one preferred embodiment of this invention they may contain functional additives such as flame and smoke suppressants or antistatic additives.

Prior to step (a) the fluoropolymer resin is advantageously extruded into the form of a thick sheet although any suitable forming process could be used, for example, compression moulding or injection moulding.

As regards the inert gases, only inert low boiling gases such as argon, carbon dioxide and nitrogen and combinations of such gases are used as blowing agents. The inert gas is allowed to diffuse into the fluoropolymer at a specific temperature and pressure to achieve a predefined density on expansion.

In one embodiment nitrogen is used as the blowing agent. This allows greater control and stability in the foaming (expansion) and post-foaming stages.

As regards the process, in step (a) the temperature is preferably above the glass transition of the fluoropolymer resin during impregnation, and advantageously at or above the melting point if the fluoropolymer is semi-crystalline. In a preferred embodiment it is between 15 and 135° C. above the melting point. One skilled in the art will recognise that both the glass transition temperature and the melting point will be influenced by the pressure at which the process is being operated.

In step b) the temperature is above the softening point of the fluoropolymer resin and is such that the resin is sufficiently soft to allow expansion to occur on release of the pressure. The temperature is advantageously at or above the melting point if the fluoropolymer is semi-crystalline. In a preferred embodiment it is 15 to 135° C. above the melting point. The pressure is reduced allowing these resins to be expanded to produce closed cell fluoropolymer foam.

In step (a3) described above, the partly expanded fluoropolymer resin may be transferred to a secondary lower pressure vessel and is reheated to a temperature at which the resin is sufficiently soft to allow expansion to occur. This temperature may be in the same range as is used in step (b). The pressure is preferably from 5 to 200 bar, more preferably 5 to 40 bar and most preferably 10 to 20 bar.

The partially expanded fluoropolymer resin from step (a2) may be heated in a mould under atmospheric pressure. The heat causes the fluoropolymer resin to soften and expand into the mould, resulting in a closed cell fluoropolymer foam artefact of the desired shape.

Alternatively, the partially expanded fluoropolymer resin from step (a2) may be retained in the form of a high density closed cell fluoropolymer foam.

As a result of the flexible nature of the process expansion ratios from less than 2:1 to greater than 75:1 can be achieved (i.e. the foam density ranges from $>1000$ kg/m$^3$ to $<20$ kg/m$^3$) and cell size can be closely controlled. Average foam cell sizes can be determined by optical microscopy and measuring and counting a minimum of 250 cells to create an acceptable statistical weight. The foams are very homogeneous. Average cell sizes may be varied between 10 and 5000 microns with a standard deviation having a value of less than 50% and preferentially less than 30% of the average cell size.

As regards the uses of the foam, the foams are usually produced in the form of sheets. The sheets can be cut using a bandsaw, water-jet cutter, router or any other technique known to those skilled in the art. They can be hot welded by standard techniques to form laminates with any desired thickness. The sheets can be cut into strips of any thickness. The fluoropolymer foam can be thermoformed into many shapes by use of a heatable mould. For instance rings, cups, half pipes, bowls, buckets, balls or oval shaped objects can be obtained. The surface will have a closed skin due to a healing effect of the outermost cell walls. The sheets can be thermoformed and fixed to form a thermal or sound insulating layer for piping systems, vessels and containers. As a result of their intrinsic chemical and radiation resistance, as well as fire resistance coupled with low flame and smoke evolution and intrinsic high purity, the fluoropolymer foams are particularly interesting for insulation purposes in chemical, electronic, microelectronic, pharmaceutical, oil and gas exploration and production, oil and gas refining, building and construction and nuclear industries. The sheets can be cut and/or thermoformed to form seals and gaskets. The sheets can be cut and/or thermoformed to obtain cable and wire electrical insulation with high flame resistance and low dielectric strength. Objects produced from fluoropolymer foam can be formed into chemically and radiation resistant floats. Shaped objects of fluoropolymer foam can be assembled with other materials by bonding with adhesives such as pressure sensitive adhesives or solvent based adhesives, for instance a solution of 5% Kynar® 721, a PVDF homopolymer in powder form from Atofina, having an MVI (melt volume index) of 10 cm³/10 min (230° C./5 kg) dissolved in DMA (dimethylacetamide), or using heat lamination techniques.

EXAMPLES

The following fluoropolymers were used:

---

Kynar ® 460

PVDF homopolymer, according to ASTM D 3222 (classification of PVDF polymers) it is a type 1, class 1 homopolymer.
Melting point: 156-162° C.
MFI (230° C., 21.6 kg) 10 g/10 min (nominal value)
Kynarflex ® 2500-20

PVDF-HFP copolymer
Melting point: 117° C.
MFI (230° C., 3.8 kg) 8 g/10 min (nominal value)
Kynarflex ® 2500-25

PVDF-HFP copolymer, anti smoke additive
Melting point: 117° C.
MFI (230° C., 3.8 kg) 8 g/10 min (nominal value)
Kynarflex ® 2800-00

PVDF-HFP copolymer
Melting point: 142° C.
MFI (230° C., 12.5 kg) 6 g/10 min (nominal value)
Kynarflex ® 2850-00

PVDF-HFP copolymer
Melting point: 158° C.
MFI (230° C., 12.5 kg) 5 g/10 min (nominal value)
Kynarflex ® 3120-50

PVDF-HFP copolymer, heterogeneous type
Melting point: 166° C.
MFI (230° C., 12.5 kg) 4 g/10 min (nominal value)

---

Example 1

A slab of Kynarflex 2850-00 was irradiated by electron beam to a dose of 50 kGy. The slab was then placed in a pressure vessel into which nitrogen was introduced to a pressure of 670 bar. The temperature was raised to 210° C. and the pressure was maintained until the slab was saturated with nitrogen. The pressure was then reduced and the pressure vessel was cooled. Once cooled the residual pressure was released to atmospheric. The partially expanded slab was placed in a second vessel and reheated to 210° C. under a pressure of 17 bar of nitrogen. The pressure was then released to ambient before cooling to give a fine celled foam with a density of 88 kg/m³.

Example 2

A slab of Kynar 460 was irradiated by electron beam to a dose of 50 kGy. The slab was then placed in a pressure vessel into which nitrogen was introduced to a pressure of 670 bar. The temperature was raised to 185° C. and the pressure was maintained until the slab was saturated with nitrogen. The pressure was then reduced and the pressure vessel was cooled. Once cooled the residual pressure was released to atmospheric. The partially expanded slab was placed in a second vessel and reheated to 185° C. under a pressure of 17 bar of nitrogen. The pressure was then released to ambient before cooling to give to give a fine celled foam with a density of 94 kg/m³.

Example 3

A slab of Kynarflex 2800-00 was irradiated by electron beam to a dose of 50 kGy. The slab was then placed in a pressure vessel into which nitrogen was introduced to a pressure of 670 bar. The temperature was raised to 185° C. and the pressure was maintained until the slab was partially saturated with nitrogen. The pressure was then reduced and the pressure vessel was cooled. Once cooled the residual pressure was released to atmospheric. The partially expanded slab was placed in a second vessel and reheated to 185° C. under a pressure of 17 bar of nitrogen. The pressure was then released to ambient before cooling to give to give a fine celled foam with a density of 81 kg/m³.

Example 4

A slab of Kynarflex 2850-00 was irradiated by electron beam to a dose of 50 kGy. The slab was then placed in a pressure vessel into which nitrogen was introduced to a pressure of 670 bar. The temperature was raised to 185° C. and the pressure was maintained until the slab was partially saturated with nitrogen. The pressure was then reduced and the pressure vessel was cooled. Once cooled the residual pressure was released to atmospheric. The partially expanded slab was placed in a second vessel and reheated to 185° C. under a pressure of 17 bar of nitrogen. The pressure was then released to ambient before cooling to give to give a fine celled foam with a density of 123 kg/m³.

Example 5

A slab of Kynarflex 3120-50 was irradiated by electron beam to a dose of 50 kGy. The slab was then placed in a pressure vessel into which nitrogen was introduced to a pressure of 670 bar. The temperature was raised to 210° C. and the pressure was maintained until the slab was saturated with nitrogen. The pressure was then reduced and the pressure vessel was cooled. Once cooled the residual pressure was released to atmospheric. The partially expanded slab was placed in a second vessel and reheated to 185° C. under a pressure of 17 bar of nitrogen. The pressure was then released to ambient before cooling to give to give a fine celled foam with a density of 110 kg/m³.

Example 6

A slab of Kynarflex 2500-20 was irradiated by electron beam to a dose of 25 kGy. The slab was then placed in a pressure vessel into which nitrogen was introduced to a pressure of 300 bar. The temperature was raised to 185° C. and the pressure was maintained until the slab was saturated with nitrogen. The pressure was then reduced and the pressure vessel was cooled. Once cooled the residual pressure was released to atmospheric. The partially expanded slab was placed in a second vessel and reheated to 185° C. under a pressure of 17 bar of nitrogen. The pressure was then released to ambient before cooling to give to give a fine celled foam with a density of 64 kg/m³.

Example 7

A slab of Kynarflex 2500-20 was irradiated by electron beam to a dose of 25 kGy. The slab was then placed in a pressure vessel into which nitrogen was introduced to a pressure of 150 bar. The temperature was raised to 185° C. and the pressure was maintained until the slab was saturated with nitrogen. The pressure was then reduced and the pressure vessel was cooled. Once cooled the residual pressure was released to atmospheric. The partially expanded slab was placed in a second vessel and reheated to 185° C. under a pressure of 17 bar of nitrogen. The pressure was then released to ambient before cooling to give to give a fine celled foam with a density of 131 kg/m$^3$.

Example 8

A slab of Kynarflex 2500-20 was irradiated by electron beam to a dose of 36 kGy. The slab was then placed in a pressure vessel into which nitrogen was introduced to a pressure of 670 bar. The temperature was raised to 185° C. and the pressure was maintained until the slab was saturated with nitrogen. The pressure was then reduced and the pressure vessel was cooled. Once cooled the residual pressure was released to atmospheric. The partially expanded slab was placed in a second vessel and reheated to 155° C. under a pressure of 17 bar of nitrogen. The pressure was then released to ambient before cooling to give to give a fine celled foam with a density of 30 kg m$^3$.

Example 9

A slab of Kynarflex 2500-25 was irradiated by electron beam to a dose of 36 kGy. The slab was then placed in a pressure vessel into which nitrogen was introduced to a pressure of 670 bar. The temperature was raised to 185° C. and the pressure was maintained until the slab was saturated with nitrogen. The pressure was then reduced and the pressure vessel was cooled. Once cooled the residual pressure was released to atmospheric. The partially expanded slab was placed in a second vessel and reheated to 155° C. under a pressure of 17 bar of nitrogen. The pressure was then released to ambient before cooling to give to give a fine celled foam with a density of 30 kg/m$^3$.

Some of the properties of these Examples are given below in Table 1.

TABLE 1

| Example No. | Resin | Foam Density kg/m$^3$ | Compressive Stress @ 50% compression ISO 7214 kPa | Tensile Strength kPa | Elongation ISO 179 % |
|---|---|---|---|---|---|
| 1 | Kynar Flex ® 2850-00 | 88 | — | — | — |
| 2 | Kynar ® 460 | 94 | 635 | 1865 | 30 |
| 3 | Kynar Flex ® 2800-00 | 81 | 340 | 1390 | 55 |
| 4 | Kynar Flex ® 2850-00 | 123 | 890 | 2660 | 30 |
| 5 | Kynar Flex ® 3120-50 | 110 | 540 | 1720 | 120 |
| 6 | Kynar Flex ® 2500-20 | 64 | 150 | 652 | 238 |
| 7 | Kynar Flex ® 2500-20 | 131 | 300 | 1170 | 290 |
| 8 | Kynar Flex ® 2500-20 | 30 | 111 | 400 | 151 |
| 9 | Kynar Flex ® 2500-25 | 30 | 110 | 385 | 220 |

The cell size distribution has been determined for examples No. 5 and No. 8, using optical microscopy techniques, and the results are collected in Table 2.

TABLE 2

| Example No. | Average cell size (μm) | Minimum cell size (μm) | Maximum cell size (μm) | Standard Deviation (μm) |
|---|---|---|---|---|
| 5 | 221 | 89 | 345 | 50 |
| 8 | 134 | 64 | 255 | 29 |

Further physical property measurements on the foam of example No. 8 show that it has a tear strength of 1015 N·m$^{-1}$ when tested in accordance with ISO 8067. The elastic properties of the fluoropolymer foams can be demonstrated using the compression set test as defined in ASTM D 3575. Measurements at 23° C. with a compression of 25% for 22 hrs give 6% and 3% set at ½ hr and 24 hrs recovery, respectively. The same experiment at 50% compression gives 11.5% and 7.5% set for ½ hr and 24 hrs recovery.

The thermal conductivity of example No. 8, determined according to ISO 8301 at 0° C., 40° C. and 80° C., is 0.033, 0.038 and 0.046 W m$^{-1}$ k$^{-1}$, respectively.

Table 3 shows the flame and smoke properties of the foam of example No. 8.

TABLE 3

| Property | Specification | Test Result |
|---|---|---|
| Heat Release | FAR/JAR 25.853(d)/(c) App F Pt IV(g) | Pass at 3 and 13 mm |
| Smoke Density | FAR/JAR 25.853(d)/(c) App F Pt V(b) | Pass at 3 and 13 mm |
| Smoke Density | ABD0031 para.7.3.2 | Pass at 3 and 13 mm |
| Toxic Gas Emission | ABD0031 para.7.4 | Pass at 3 and 13 mm |
| Vertical Bunsen Burner | FAR/JAR 25.853(a) App F Pt I | Pass at 5 and 30 mm |
| Radiant Panel | FAR/JAR 25.856 App F Pt VI | Pass at 5 and 30 mm |

The invention claimed is:

1. A process for making closed cell fluoropolymer foam comprising the steps of:
   (a) subjecting a fluoropolymer resin to at least one inert gas at a pressure higher than atmospheric in order to drive gas into the resin,
   (a1) raising the temperature of the resin to or above its softening point, wherein steps (a) and (a1) can take place in any order or simultaneously, and
   (b) reducing the pressure whilst maintaining the temperature at or above the softening point of the resin, in order to expand the resin to result in closed cell fluoropolymer foam,
   wherein the resin is cross-linked prior to expansion.

2. A process as claimed in claim 1 in which before step (b) the following steps are carried out:
   (a2) the pressure is lowered to a pressure higher than atmospheric pressure but lower than the pressure of step (a) and the resin is cooled to below its softening point to result in a partially expanded fluoropolymer resin,
   (a3) the partially expanded fluoropolymer resin is heated to a temperature above its softening point under a pressure of inert gas or air.

3. A process as claimed in claim 2 in which step (a) takes place with the resin in a first vessel and wherein, before step (a3) is carried out, the partially expanded resin is transferred to a second vessel.

4. A process as claimed in claim 2, wherein, the temperature of the partially expanded resin resulting from step (a2) is reduced to slow the loss of the gas from the resin.

5. A process as claimed in claim 1 wherein the resin is cross-linked by irradiating it with an electron beam or with gamma radiation.

6. A process as claimed in claim 5 wherein the radiation dose is from 5 to 200 kGy.

7. A process as claimed in claim 1 wherein the closed cell fluoropolymer foam is substantially homogeneous.

8. A process as claimed in claim 1 which is carried out only on said fluoropolymer resin and not on any other material simultaneously with said resin.

9. A process as claimed in claim 1 wherein, a second non-cross linked resin is present whilst the process is being carried out, and the resin that is cross linked prior to expansion expands more than the second non-cross linked resin.

10. A process as claimed in claim 1 which is a batch process.

11. A process as claimed in claim 1 wherein the fluoropolymer resin is substantially free of nucleants.

12. A process as claimed in claim 1 in which the fluoropolymer resin is, prior to step (a), extruded into the form of a sheet.

13. A process as claimed in claim 1 in which the fluoropolymer resin is a PVDF homopolymer.

14. A process as claimed in claim 1 in which the fluoropolymer resin is a PVDF copolymer and the proportion of VDF is at least 60% by weight.

15. A process as claimed in claim 14 in which the fluoropolymer resin is a PVDF copolymer and the proportion of VDF is at least 85% by weight.

16. A process as claimed in claim 1 in which in step (a) the temperature is from 15 to 135° C. above the melting point.

17. A process as claimed in claim 1 in which in step (a) the pressure is from 20 to 1000 bar.

18. A process as claimed in claim 17 in which in step (a) the pressure is from 20 to 800 bar.

19. A process as claimed in claim 2 in which in step (a3) the pressure is from 5 to 200 bar.

20. A process as claimed in claim 19 in which said pressure is from 5 to 40 bar.

21. A process as claimed in claim 1 in which in step (b) the temperature is from 15 to 135° C. above the melting point.

* * * * *